US011396465B2

(12) United States Patent
Palmer

(10) Patent No.: US 11,396,465 B2
(45) Date of Patent: Jul. 26, 2022

(54) SYSTEM AND METHOD FOR COLLECTING AND UTILIZING HEAT FROM AN EFFLUENT DISPOSAL SYSTEM

(71) Applicant: Stephen Palmer, York, ME (US)

(72) Inventor: Stephen Palmer, York, ME (US)

(*) Notice: Subject to any disclaimer, the term of this patent is extended or adjusted under 35 U.S.C. 154(b) by 0 days.

(21) Appl. No.: 17/272,687

(22) PCT Filed: Oct. 2, 2020

(86) PCT No.: PCT/US2020/053924
§ 371 (c)(1),
(2) Date: Mar. 2, 2021

(87) PCT Pub. No.: WO2021/067684
PCT Pub. Date: Apr. 8, 2021

(65) Prior Publication Data
US 2021/0317019 A1    Oct. 14, 2021

Related U.S. Application Data

(60) Provisional application No. 62/909,880, filed on Oct. 3, 2019.

(51) Int. Cl.
*C02F 3/04* (2006.01)
*F28F 3/00* (2006.01)
(Continued)

(52) U.S. Cl.
CPC .................. *C02F 3/04* (2013.01); *C02F 3/10* (2013.01); *F28F 3/00* (2013.01);
(Continued)

(58) Field of Classification Search
CPC ........ C02F 3/04; C02F 3/10; C02F 2103/002; C02F 2303/10; C02F 2103/005; C02F 3/104; C02F 3/043; C02F 3/046; C02F 3/101; F24T 10/10; F25B 30/06; Y02B 30/52; Y02W 10/10; Y02W 10/30;
(Continued)

(56) References Cited

U.S. PATENT DOCUMENTS 3,227,429 A * 1/1966 Renzi ...................... B01J 19/32
                                                        435/813
4,066,550 A * 1/1978 Beaumont ................. C02F 1/02
                                                        210/183
(Continued)

FOREIGN PATENT DOCUMENTS

JP          5895589 A     7/1983
JP       2012115813 A2    6/2012
WO   WO-2009062032 A1 *  5/2009  .............. F24T 10/40

OTHER PUBLICATIONS

Bialobrzewski et al. "Model of the sewage sludge-straw composting process integrating different heat generation capacities of mesophilic and thermophilic microorganisms" Waste Management, vol. 43 (Jun. 15, 2015): pp. 72-83; entire document.

*Primary Examiner* — Joseph W Drodge

(57) ABSTRACT

A system and method for collecting heat generated by the microbial action in a septic system effluent disposal area that is then transferred to a building structure where it may provide, for example, the temperature differential for a heat exchanger in a heat pump, thereby being the energy source for heating and cooling buildings.

19 Claims, 3 Drawing Sheets

(51) Int. Cl.
*C02F 3/10* (2006.01)
*C02F 103/00* (2006.01)

(52) U.S. Cl.
CPC .. *C02F 2103/002* (2013.01); *C02F 2103/005* (2013.01); *C02F 2303/10* (2013.01)

(58) Field of Classification Search
CPC .... F28F 3/00; F28F 3/005; F28F 21/00; F28F 21/003; F28F 25/00; F28F 25/02; F28F 2025/005; F28D 21/001; F28D 2021/0019
USPC .......................................... 210/600, 170.08
See application file for complete search history.

(56) References Cited

U.S. PATENT DOCUMENTS

| | | | | |
|---|---|---|---|---|
| 5,533,355 | A * | 7/1996 | Rawlings | E21B 23/00 |
| | | | | 62/260 |
| 5,958,239 | A * | 9/1999 | Sing | C02F 3/02 |
| | | | | 210/605 |
| 6,814,866 | B1 * | 11/2004 | Potts | B09C 1/06 |
| | | | | 210/612 |
| 7,571,618 | B2 * | 8/2009 | Dessiatoun | H01L 23/473 |
| | | | | 165/80.1 |
| 8,252,182 | B1 | 8/2012 | Bhang et al. | |
| 2002/0144600 | A1 * | 10/2002 | TeGrotenhuis | B01J 19/0093 |
| | | | | 95/273 |
| 2002/0144807 | A1 * | 10/2002 | McCrorie, IV | F28D 1/06 |
| | | | | 165/169 |
| 2016/0231011 | A1 * | 8/2016 | Ankeny | F24F 5/0046 |
| 2019/0225518 | A1 | 7/2019 | Tartakovsky et al. | |

* cited by examiner

SYSTEM AND METHOD FOR COLLECTING AND UTILIZING HEAT FROM AN EFFLUENT DISPOSAL SYSTEM

BACKGROUND INFORMATION

Field of the Invention

The invention relates to effluent disposal systems and methods of collecting and using the heat that is naturally generated by the microbial breakdown of nutrients in the effluent.

Discussion of Prior Art

Building structures with sanitary facilities commonly have a drain, waste, and vent system (DWV) which conducts sanitary waste to a disposal system, be it a private system or a municipal system.

One type of disposal system is a conventional field type Effluent Disposal System (EDS), also termed an Individual Sewage Disposal System, processes waste water and raw sewage that leaves a building by, generally, separating the solids in a septic tank and then sending the liquid effluent through a system of pipes, often by way of a distribution box, to an Effluent Disposal Area (EDA) where the effluent spreads out, breaks down, and is absorbed into a field. More specifically, the liquid effluent is dispersed across a sufficient distance that ensures the effluent is completely free of unbroken organics when it reaches a restrictive layer that does not readily absorb liquids, thus dispersing it across its upper boundary, or a water table, which is otherwise contaminated by untreated effluent.

All sanitary fixtures in a building structure are connected at some point to the DWV. The vent system is a continuous piping that supplies make up air to the system, which is required because of the following: when a water closet, e.g. toilet, is flushed, or dropped in plumbing terms, the water closet (wc) discharges the volume of the bowl and trap, at least a gallon of liquid effluent, in many cases more, at one time; while that drop is occurring, the tank or supply to the toilet simultaneously refills the bowl and trap; this creates a partial vacuum behind the discharged liquid which may pull the water from the wc trap, but more likely from a sink trap, which is smaller, as the water passes the sink drain line where it connects to the main plumbing pipe; this problem is mitigated by having an interconnected line of pipe that intercepts the drain line from each fixture (sink, wc, etc.) that extends from above the roof of the structure to the main drain to the EDA and is open for free air movement.

The typical EDA is comprised of a number of layers, including: 1) a in situ restrictive layer and receiving/absorbent layer; 2) a disposal layer where untreated effluent is distributed by pipe; 2) a barrier layer of hay, sand and/or other similarly suitable material; and 3) a finish grade of topsoil, paving or other suitable surface material. The disposal field is where the microbial action breaks down the organic components in the effluent.

Breaking down the organic components in the effluent occurs in two primary ways. The first is a continuous field of coarse stone or absorptive material that uniformly receives the effluent. The stone or absorptive material by its nature has substantial air to support microbial action for the breakdown. The microbes, e.g. bacteria, form a biomat on the surfaces of the stone or absorptive material that breaks down the organics in the effluent. The treated effluent then exits the bed downward.

The second manner of breakdown includes the use of large diameter pipe that receives the effluent in a sand field. The fabric surrounding the pipe supports a biomat that breaks down the untreated effluent, with the treated effluent exiting the bed downward.

The effluent in the drainage field naturally provides heat by virtue of the exothermic nature of the microbial breakdown of nutrients in effluent. In general, the temperature range in a properly functioning EDS is around 50 degrees Fahrenheit and above, depending on ambient temperature.

Ordinarily, the relatively consistent level of heat generated naturally by this process is wasted. What is needed, therefore, is a system and method that collects and uses the heat that is generated by this process.

BRIEF SUMMARY OF THE INVENTION

The invention is a system and method for collecting heat generated by the microbial action in a septic system effluent disposal area ("EDA") that is then transferred to a building structure where it may provide, for example, the temperature differential for a heat exchanger in a heat pump, thereby being the energy source for heating and cooling buildings.

In this example, the heat collection source is the EDA itself and not ancillary to the septic system. the energy collected from the EDA is transferred to a heat exchanger filled with refrigerant that is compressed to generate heat that is radiated to the distribution system to the structure. For cooling, the compressed refrigerant is sent through an expansion valve/tank where the compressed refrigerant expands and cools, the cooled refrigerant radiates the cool energy to the distribution system (usually forced air or liquid radiant, the same as for heating).

Collecting the energy directly from the EDA in this manner is the most efficient way to utilize the temperature from the microbial action as there is no radiant loss of energy with intermediary structures as in prior systems utilizing septic systems as the source of energy.

More specifically, a heat collection system is provided that uses tubing placed directly on top of effluent dispersion components. The dispersion components may be, but are not limited to:

- stone and pipe, which is an older system using perforated pipe in a coarse stone bed where the effluent exits the pipe via the perforations into the surrounding stone. Air entering the system through the pipe and dispersing into the stone plus air penetrating from covering materials supports microbial action inherent in any EDA. The microbial action results in effluent organic matter is broken down by feeding microbes, with substantially cleaned water, organic materials removed, dispersing into the ground.
- effluent dispersion media in the form of "pillows" of coarse woven wire, similar in structure to very coarse steel wool, that disperse the effluent within the pillow, where air is present to support microbial action.
- large collection tubes wrapped in filter fabric that receive the effluent which saturates the filter fabric. The filter fabric becomes a microbial mat through which the effluent passes, feeding the microbes in the process.

So long as air is present, healthy microbes exist in the system in sufficient numbers to break down the organics, and a sufficient supply of effluent is available, no other controlling mechanism is required for the generation of heat for the collection tubing.

The inventive system, using the microbial action for heat transferred to a liquid medium in the EDA, is typically less expensive to install by virtue of not needing drilled wells for ground water heat, or substantial excavation to depths determined by locale of large areas of land, as much as an acre, depending on soil type and other conditions, for a horizontal system. In all cases the design criteria for an effective system are:

The required amount heating and/or cooling British thermal units (BTUs), where one unit is the quantity of energy to raise the temperature of one pound of water one degree Fahrenheit ("F") at a specified temperature, often 39 degrees F. at which water is most dense, to meet temperature design parameters for the structure.

Source of heat or cooling of the liquid transfer medium adequate to supply the required BTUs, most likely a heat pump system capable of providing the resulting heating/cooling for the structure.

An adequate distribution capability for conditioning the structure

A properly adjusted transfer medium pump; and an integrated design so that all components are compatible and meet the requirements for the structure on a continuous basis.

The design parameters and materials for any geothermal system supplying a structure with heating or cooling capability are unique to the setting, unless placed in identical situations.

As noted, the system collects thermal energy directly from the EDA through tubing that contains one of several liquid transfer media, depending on suitability to the design parameter and heat pump system. Essentially, the energy collected from the EDA is transferred to a heat exchanger filled with refrigerant that is then compressed to generate heat that is radiated to the distribution system to the structure. For cooling, the compressed refrigerant is sent through an expansion valve/tank where the compressed refrigerant expands and cools, the cooled refrigerant radiates the cool energy to the distribution system, which is usually forced air or liquid radiant, the same as for heating.

Water is a common collection medium and if the BTU requirements for the structure match the collection capacity of the tubing installed and the cooled water from the heat exchanger recirculating back to the EDA for energy collection is kept above freezing, then water is a suitable choice for the collection medium. If a well or horizontal system is designed, more well depth or more tubing may be added for more BTUs to be transferred without the heat pump system having to draw energy from the transfer medium to supply the BTU requirement for the structure to the point that it freezes.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
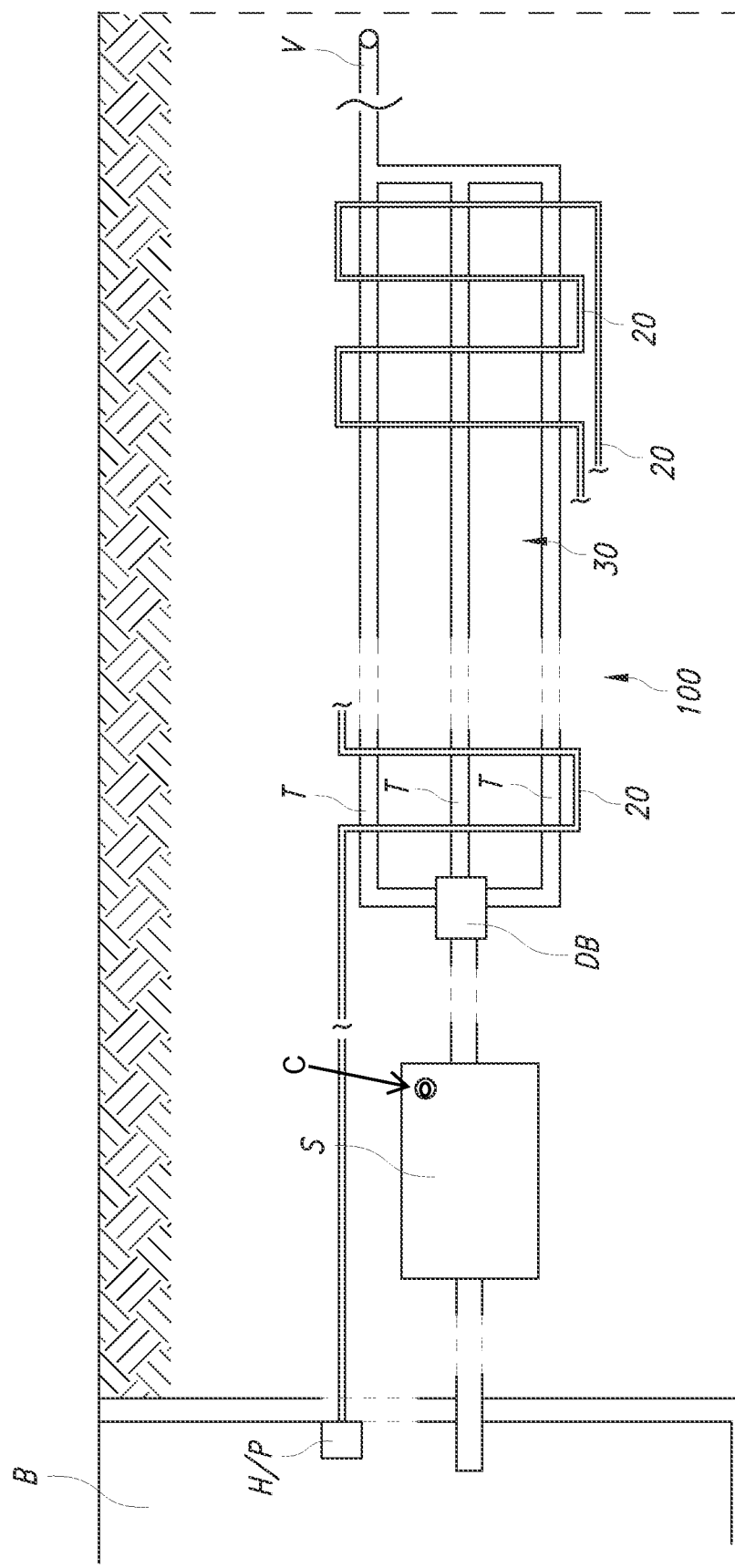
FIG. 1 is a top view of the system according to the invention.
Figure 2:
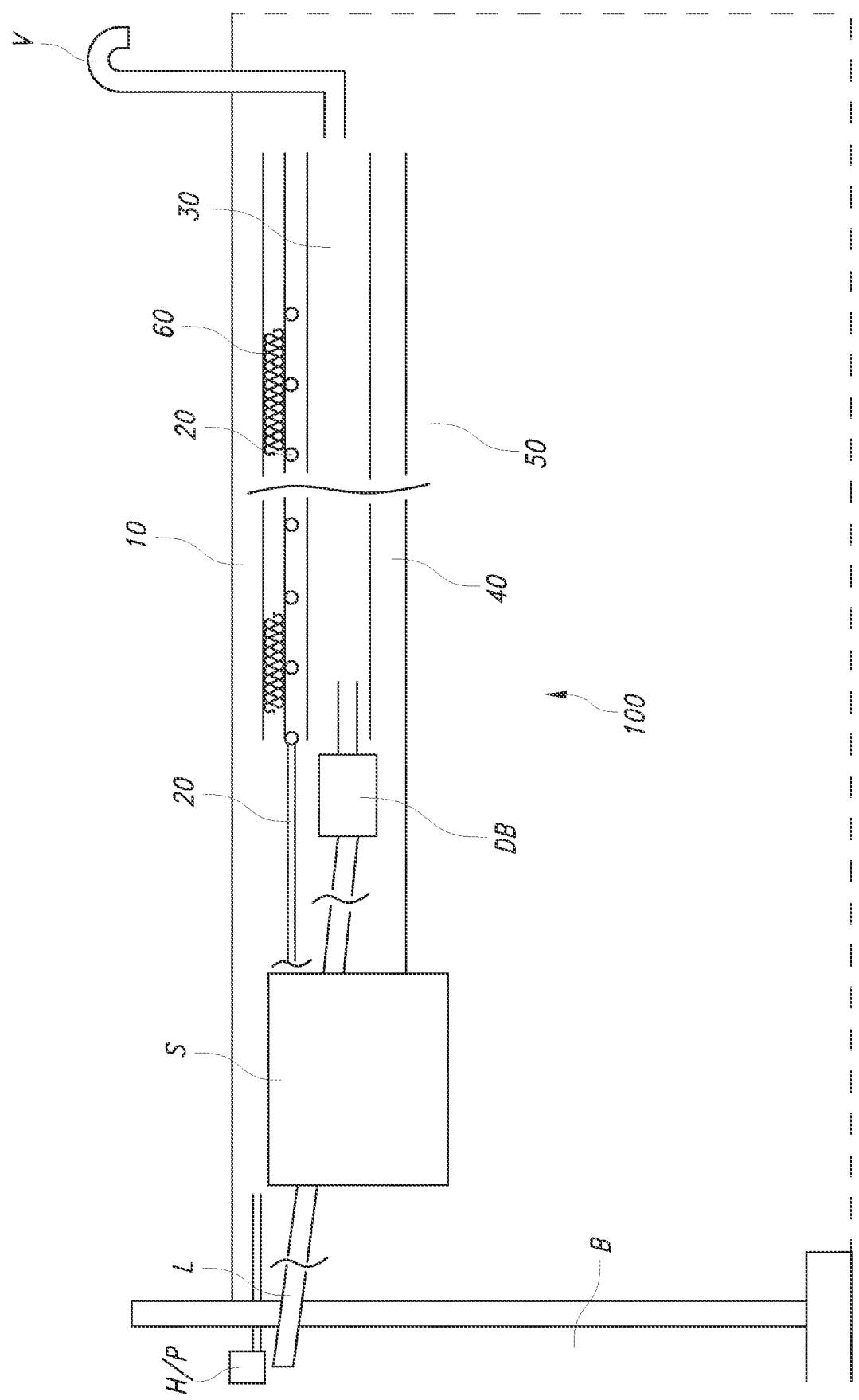
FIG. 2 is a sectional view of the system showing the layers in the drainage field.
Figure 3:
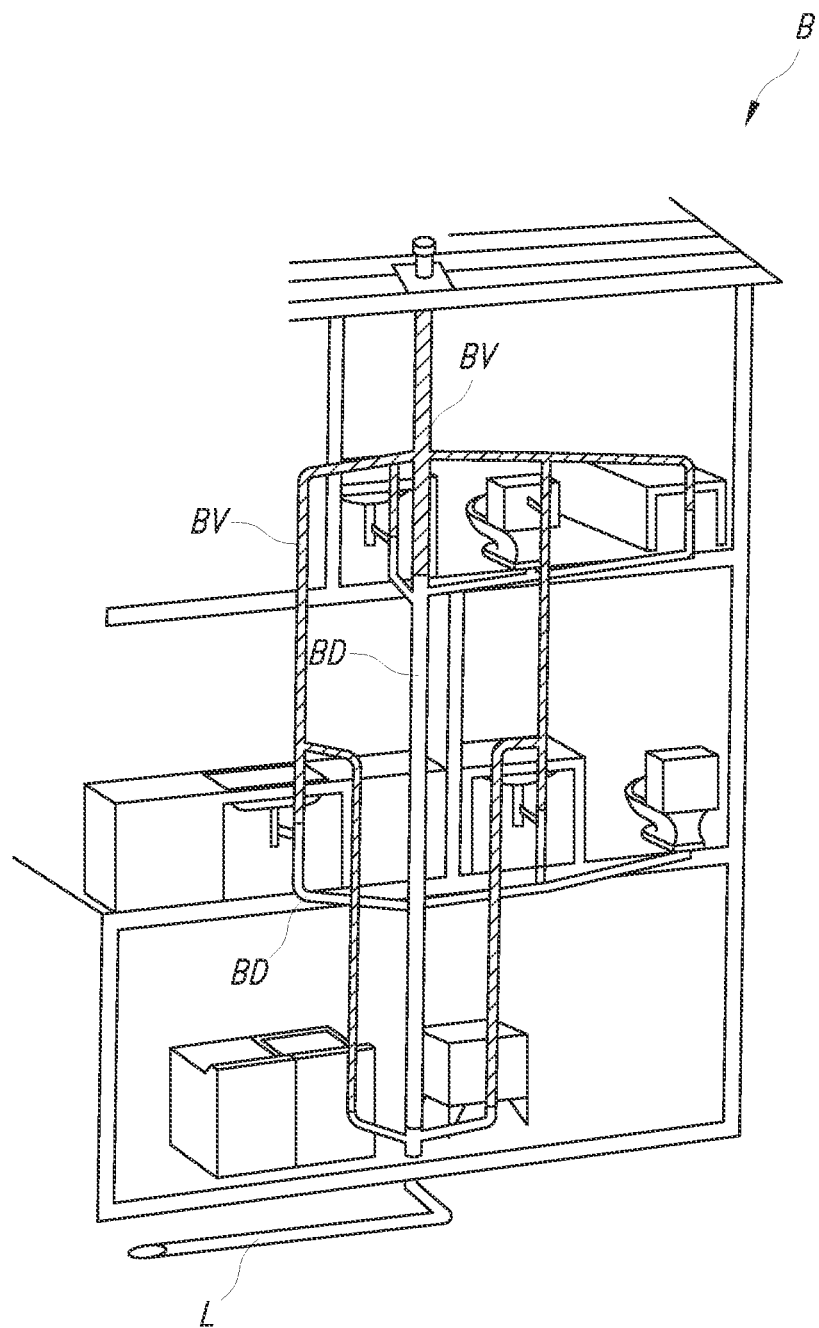
FIG. 3 is a cross-sectional side view of a building structure showing the plumbing and venting system.

FIGS. 1-3 illustrate a heat collecting effluent disposal system 100 ("EDS") for use in practicing a method of heat collection. The EDS 100 is adapted to collect heat from effluent in an effluent disposal area 30, after which the system 100 may convey that heat to a conventional heat pump H designed for use with any geothermal system for use in providing the heating/cooling requirements for a building structure B.

More specifically, the heat collecting EDS 100 includes a layer of finish material 10, a layer of thermal transfer material 20, the effluent disposal area ("EDA") 30, a layer of clean fill 40, and a bottom restrictive layer 50. An insulation layer 60 may be inserted between the finish material 10 and the layer of thermal transfer material 20. There may also be a receiving layer above the restrictive layer.

To one side of the system 100 is a conventional building B that has conventional plumbing that causes waste to exit the building by a sewer line L and into a septic tank S where the solids are separated from the liquid effluent and the effluent sent out of the tank S and into a distribution box DB for dispersal into the EDA through effluent distribution tubing T. Aerobic microbes require air for proper function. This air is supplied to the EDA through absorption through permeable finish materials covering the EDA and the air that is transported to the EDA through the building plumbing venting BV and plumbing drainage BD, a system that provides additional air to the waste plumbing piping which is continuous to the EDA. An air vent V may be connected to the end of the effluent distribution tubing T for the EDA in the conventional manner, and is likely a required component if a layer of insulation or impermeable finish material is installed.

The thermal transfer material 20 in the embodiment shown is heat transfer tubing, and in particular liquid heat transfer tubing. For example, tubing made of high density polyethylene (HDPE) is a well suited for the thermal transfer material 20. Other options include tubing made of polyvinylchloride (PVC) or aluminum. The tubing is placed above the EDA in a continuous loop and is a closed system that is connected to a heating and cooling system H that is used with the building B. For example, the tubing may pass through a conventional heat exchanger. The closed system is pre-filled with a transfer medium that is in liquid form, which may simply be water. The length and diameter of the tubing is determined by the size of the field and by the intent of the collection, for example, the thermal requirements of the building to be heated or cooled. As the effluent breaks down and generates relatively consistent level of heat that heat rises and warms the surrounding area. That heat is then absorbed by the thermal transfer medium, and a standard, geothermal heat pump system P causes the warmed liquid to heat the refrigerant in the heat exchanger, which then, by virtue of the heat pump system, moves the refrigerant to a compressor which generates additional heat which is then transferred via the refrigerant to the conventional building heating system, either forced air or radiant. If cooling is required, the heated refrigerant is directed to an expansion tank where, when the refrigerant expands, it cools rapidly. That cool energy is transferred to the building cooling system, the same as the transfer of heat. It is likely that some amount of tubing is needed to carry the thermal transfer medium from the EDA to the building B and in such a case closed cell pipe insulation may be applied to the tubing to help retain as much heat as possible as the medium enters the heat pump.

The standard geothermal heat pump system P, includes: 1) a circulating pump that moves the transfer medium between the EDA and the heat pump system; 2) a heat exchanger that receives the transfer medium energy via a refrigerant in the heat pump system; 3) a circulator pump to cycle the refrigerant to the components; and 4) a compressor that compresses the refrigerant, generating heat that is transferred to a hot air or radiant heat system. If cooling is required, an expansion tank is placed in line after the compressor. When the compressed refrigerant is rapidly allowed to decompress it cools rapidly, the cold is then transferred to an air or radiant system.

The components of the geothermal system are all interconnected and function at given capacities based on material used and application, as follows:

the transfer medium pump speed is set according to the British thermal unit ("BTU") transmissivity of the transfer medium (water, ethanol, etc.) and the BTU requirements of the structure. This is also impacted by the capacity of the heat exchanger as well as the size of the EDA and the length and material of pipe installed for collection.

the heat exchanger has to be sized to draw the BTU requirement for the structure and have the return flow of the transfer medium still in a fluid form, which is another function of flow rate from the transfer medium pump. If the transfer medium returns to the EDA too cold to support microbial action, a conditioning coil C of piping returning the medium to the EDA is placed in the septic tank, which maintains a temperature at or above the surrounding earth. The length of the conditioning coil is determined by the transmissivity of the transfer medium, the temperature at entry to the septic tank, and desired temperature entering the EDA. The components of the heat exchanger have to be compatible with the transfer medium.

The size of the septic tank above the local required minimums may be affected by the need of preconditioning of the return medium conditioning coil C, if required.

As noted, water is a common collection medium and if the BTU of heat requirements for the structure match the collection capacity of the tubing installed and the cooled water from the heat exchanger recirculating back to the EDA for energy collection may be kept above freezing, then water is a good choice for the collection medium. If a well or horizontal system is designed, more well depth or more land excavated to provide more collection tubing interface with the heat source, for example ground water or earth at 4 foot or greater depth, may be added for more BTU's to be transferred without the heat pump system having to draw additional energy from the transfer medium to supply the BTU requirement for the structure to the point that the medium freezes. Depending on the type of EDA, the tubing requirement for 12,000 BTU's (one ton, in heating, ventilation, and air condition ("HVAC") terms) is between 475 and 600 feet of 1″ HDPE pipe when using water as the medium.

Several other transfer mediums may also be used, though many come with toxic potential or flow restrictions at various pump velocities and/or temperatures. Ethanol is a suitable alternative in that energy at the exchanger may be extracted down to 15 degrees Fahrenheit ("F") and still flow back to the EDA for collection. Microbes in the EDA are unlikely to survive with return medium liquid entering the system at 15 degrees F. Creating a coil C of return medium piping of sufficient length placed inside the septic tank, which functions at or above surrounding ground temperatures, is able to precondition the return medium, ethanol in this case, to a temperature not detrimental to the microbial action of the EDA.

The layer of insulating material 60 may also be provided to helps contain heat in around the thermal transfer materials and maintains a temperature range in the EDS that is conducive to microbial action. The specific insulation material and the associated insulating value are determined by the ambient temperature range in the geographic location. For example, closed cell sheets that cover most or all of the transfer layer 20 is often appropriate. This allows the EDS to function as designed with no deleterious impact from the collection of the rising heat from the EDS by the transfer tubing.

The finish material 10 is a conventional material used for such purposes, such as topsoil, paving or other suitable surface.

As previously noted, the thermal transfer material 20 is connected to a building, where it may be used with a conventional heat pump system. In this example, the warmed medium provides the temperature differential for the heat exchanger to transfer the heat to a refrigerant, which is then piped through the remainder of the conventional heat pump system.

To construct the EDS 100 the system components are designed so that the EDA and other components of the septic system are installed as is appropriate for site conditions. The EDA is built to the point of effluent conducting tubing or distribution matrix materials, as discussed earlier, and the requisite sand or stone are in place. The tubing of choice is placed per design. For example, the tubing may be High Density Polyethylene tubing having approximately a 1 inch diameter. If an insulating material is required over the tubing it is installed over the final coarse of sand or hay depending on the type of EDA. If a preconditioning coil on the return line to the EDA for the transfer medium is required it is placed in the septic tank and connected to the return line incoming and outgoing the tank. Septic tank manufacturers should be consulted for coordination of placement, entrance and exit of the coil. All HDPE tubing and connections should have minimum 160 pounds per square inch (PSI) break strength. Supply tubing from the EDA to the heat exchanger should be insulated with minimum of 2 inch closed cell pipe insulation or equivalent. The lines are connected to the heat exchanger interface, and the heat pump components are adjusted to design specification. The transfer medium lines are then charged with appropriate material. Slight adjustments may be needed based on various local, state and plumbing codes.

It is understood that the embodiments described herein are merely illustrative of the present invention. Variations in the construction of the system and/or steps in the method may be contemplated by one skilled in the art without limiting the intended scope of the invention herein disclosed and as defined by the following claims.

What is claimed is:

1. An effluent disposal system that receives effluent from a plumbing system and that is adapted to collect heat from the effluent, the effluent disposal system comprising:

a first layer, a second layer, and a third layer, each of the respective layers horizontally oriented in the effluent disposal system with the first layer positioned above the second layer and the second layer positioned above the third layer, the first layer configured as a finish layer, the second layer configured as a thermal transfer layer that includes a thermal transfer medium;

the third layer configured as an effluent dispersion area that includes one or more components that are configured as a drainage field to allow the effluent to spread downward throughout the drainage field and experience microbial action; and the configuration of the second layer and third layer, relative to one another, arranged to prevent effluent from dispersing down upon the thermal transfer layer;

wherein the thermal transfer medium moves through the thermal transfer layer and absorbs heat that rises up from the effluent dispersion area.

2. The effluent disposal system of claim 1, further including a pump that causes the thermal transfer medium to pass through the thermal transfer layer.

3. The effluent disposal system of claim 1, further including a clean fill layer beneath the thermal transfer layer.

4. The effluent disposal system of claim 1, further including a bottom restrictive layer beneath the thermal transfer layer.

5. The effluent disposal system of claim 1, wherein the thermal transfer medium is water.

6. The effluent disposal system of claim 1, wherein the thermal transfer medium is ethanol.

7. The effluent disposal system of claim 1, further including an insulating layer and an air vent, the insulating layer positioned between the first and second layers.

8. The effluent disposal system of claim 1, wherein the thermal transfer layer is comprised of tubing.

9. The effluent disposal system of claim 8, wherein the tubing is made of high density polyethylene.

10. The effluent disposal system of claim 1, further including an insulation layer horizontally positioned above the thermal transfer layer and beneath the finish layer, the insulation layer adapted to maintain the natural temperature of the effluent disposal dispersion area that is warmed by heat emitted from the effluent.

11. The effluent disposal system of claim 10, wherein the insulation layer is comprised of closed cell sheets that cover a majority of the thermal transfer layer.

12. A heating and cooling system comprising:

an effluent disposal system that receives effluent from a plumbing system, the effluent disposal system including a first layer, a second layer, and a third layer, each of the respective layers horizontally oriented in the effluent disposal system with the first layer positioned above the second layer and the second layer positioned above the third layer, the first layer configured as a finish layer;

the second layer configured as a thermal transfer layer that includes a thermal transfer medium; and the third layer configured as an effluent dispersion area that includes one or more components that are configured as a drainage field to allow the effluent to spread throughout the drainage field and experience microbial action; and a heat pump system that is connected to the thermal transfer layer;

wherein the thermal transfer material flows through the thermal transfer layer where it absorbs heat from the effluent and passes through the heat pump system where it provides the temperature differential for a heat exchanger in the heat pump system.

13. The heating and cooling system of claim 12, the heat pump system including a pump that causes the thermal transfer material to pass through the thermal transfer layer.

14. The heating and cooling system of claim 12, further including a clean fill layer beneath the thermal transfer layer.

15. The heating and cooling system of claim 12, further including a bottom restrictive layer beneath the thermal transfer layer.

16. The heating and cooling system of claim 12, wherein the thermal transfer material is water.

17. The heating and cooling system of claim 12, further including an insulating layer and an air vent, the insulating layer positioned between the first and second layers.

18. The heating and cooling system of claim 12, wherein the thermal transfer layer is comprised of tubing.

19. The heating and cooling system of claim 18, wherein the tubing is made of high density polyethylene.

* * * * *